(12) United States Patent
Kato et al.

(10) Patent No.: US 6,302,753 B1
(45) Date of Patent: Oct. 16, 2001

(54) ACCESSORY DRIVE FOR DIRECT INJECTED OUTBOARD MOTOR

(75) Inventors: Masahiko Kato; Yoshihiko Okabe, both of Shizuoka (JP)

(73) Assignee: Sanshen Kogyo Kabushiki Kaisha (JP)

( * ) Notice: Subject to any disclaimer, the term of this patent is extended or adjusted under 35 U.S.C. 154(b) by 0 days.

(21) Appl. No.: 09/387,264

(22) Filed: Aug. 31, 1999

Related U.S. Application Data

(63) Continuation-in-part of application No. 09/145,912, filed on Sep. 2, 1998, now Pat. No. 6,112,726.

(30) Foreign Application Priority Data

| Sep. 3, 1997 | (JP) | 9-238118 |
| Sep. 3, 1997 | (JP) | 9-238508 |
| Sep. 3, 1997 | (JP) | 9-238509 |
| Aug. 31, 1998 | (JP) | 10-244545 |

(51) Int. Cl.⁷ .................................................. B63H 21/38

(52) U.S. Cl. ........................................ 440/88; 416/196 W

(58) Field of Search .............................. 440/88, 77, 900; 123/196 W

(56) References Cited

U.S. PATENT DOCUMENTS

| 5,370,563 | * 12/1994 | Yamazaki et al. .............. 440/88 |
| 5,701,872 | * 12/1997 | Kaku et al. .................... 123/495 |
| 6,032,628 | 3/2000 | Watanabe et al. ............... 440/900 |
| 6,070,564 | 6/2000 | Hiraoka et al. ................. 440/900 |
| 6,112,726 | 9/2000 | Saito et al. ..................... 440/900 |

* cited by examiner

Primary Examiner—Jesus D. Sotelo
(74) Attorney, Agent, or Firm—Knobbe, Martens, Olson & Bear, LLP.

(57) ABSTRACT

A drive mechanism for a high pressure fuel pump on a vertically oriented engine present a compact arrangement while driving the pump at a desired speed tailored to the engine's size and fuel supply needs. The drive mechanism includes a small diameter drive pulley mounted above a rotor (e.g., a flywheel or a cam drive pulley). This position permits easily access to the drive pulley for repair, replacement and belt positioning. The small diameter drive pulley drives a larger diameter driven pulley coupled to the fuel pump. The size of the drive and driven pulleys are selected to achieve a reduction ratio suited to drive the high pressure fuel pump at a speed tailored to supply an appropriate amount of fuel to the fuel injectors at an effective pressure for injection. In addition, the smaller diameter of drive pulley, and consequently the smaller diameter of the driven pulley, reduces the size of the engine.

27 Claims, 6 Drawing Sheets

ACCESSORY DRIVE FOR DIRECT INJECTED OUTBOARD MOTOR

RELATED APPLICATIONS

This application claims priority to Japanese Application No. 10-244545, which was filed on Aug. 31, 1998. Also, this application is a continuation-in-part of U.S. Ser. No. 09/145,912, filed Sep. 2, 1998, now U.S. Pat. No. 6,112,726, issued Sep. 5, 2000, which claims priority to Japanese Application Nos. 9-238118, 9-238508, and 9-238509, all of which were filed on Sep. 3, 1997.

BACKGROUND OF THE INVENTION

1. Field of the Invention

This invention relates to a vertical engine of the type employed in outboard motors and more particularly to an improved fuel injection system for such vertical engines.

2. Description of the Related Art

The use of fuel injection for internal combustion engines in order to improve performance, particularly fuel economy and exhaust emission control, is well known. A wide variety of types of fuel injection systems have been proposed for this purpose. Many of these systems inject the fuel into the induction system rather than into the combustion chamber. Such so-called "manifold injected" engines have advantages over carbureted engines. However, there are a number of additional advantages that can be obtained by utilizing direct cylinder injection.

By using direct cylinder injection, it is possible to more accurately control the actual fuel-air ratio in the combustion chamber on each cycle of operation. In addition, by utilizing direct cylinder injection, it is possible to obtain stratification in the combustion chamber and thus operate with a lean mixture under some or most running conditions. That is, by stratifying the charge in the combustion chamber, it is not necessary to have a homogeneous stoichiometric charge in the entire combustion chamber. All that is required is to have a stoichiometric charge present in the vicinity of the spark plug at the time that it is fired in order for combustion to be initiated.

There are, however, a number of reasons why direct cylinder injection is not utilized more widely. Not the least of these is cost. Not only are the injectors more costly and more critical with direct injected engines, but the supply system for supplying fuel to the injectors also becomes more complicated and expensive.

When direct cylinder injection is employed, the injection pressures must not only be higher, but they also must be more accurately controlled. As a result of this, it has been the practice to normally employ reciprocating plunger-type pumps for direct injected engines. Such pumps have a number of components, are complex, and in fact, can become quite bulky.

Although these problems may be overcome in some applications, there is a desire to employ direct cylinder or high pressure fuel injection systems for outboard motors. Like other vehicle applications, outboard motors are subject to concern over environmental control and also fuel economy. In addition, outboard motors frequently utilize two-cycle engines as their power plants. These engines can benefit as much or more from direct cylinder fuel injection as four-cycle engines.

In addition to the cost factor, the complexity of high pressure injection systems makes it more difficult to integrate them into outboard motors. One reason for this is that the outboard motor is a very compact type of device, and it may be difficult to locate the necessary components for a high pressure fuel injection system. In addition, the injection pump normally is driven off of the engine crankshaft and is frequently in timed relationship thereto. This further complicates the placement and driving of such high pressure fuel injection pumps in outboard motors.

In addition to these problems, an outboard motor has another problem which is somewhat unique and different from automotive or other vehicle applications. That is, it is normally the practice to mount an outboard motor engine so that its crankshaft rotates about a vertically extending axis. As a result, the orientation of the engine is quite different than automotive and other applications. This further complicates the location and driving of accessories, such as high pressure fuel injection pumps.

SUMMARY OF THE INVENTION

A need therefore exists for an improved drive arrangement for a high pressure fuel injection pump for an internal combustion engine of an outboard motor.

An aspect of the present invention involves an outboard motor comprising a power head. The power head contains an internal combustion engine including a crankshaft that is disposed generally vertically. A rotor (e.g., a flywheel and/or cam drive pulley) is affixed to the crankshaft. A drive pulley is affixed to the crankshaft above the rotor and has a first diameter. A driven pulley has a second diameter which is larger than the first diameter. A drive belt connects the drive pulley to the driven pulley, which in turn is coupled to and drives a high pressure fuel pump.

In a one mode, the driven pulley is connected to a pump drive unit which drives the pump. The size of the drive pulley and driven pulley also are selected to achieve a reduction ratio suited to drive the high pressure fuel pump at a speed tailored to supply an appropriate amount of fuel to the fuel injectors at an effective pressure for injection.

Further aspects, features and advantages of the present invention will become apparent from the detailed description of the preferred embodiment which follows.

BRIEF DESCRIPTION OF THE DRAWINGS

The above mentioned and other features and aspects of the invention will now be described with reference to the drawings of a preferred embodiment of the present engine construction. The illustrated embodiment, however, is intended to illustrate and not to limit the invent. The drawings contain the following figures:

FIG. 5b is a cross-sectional view of the belt tensioner of FIG. 5a;

DETAILED DESCRIPTION OF THE PREFERRED EMBODIMENT

Figure 1:
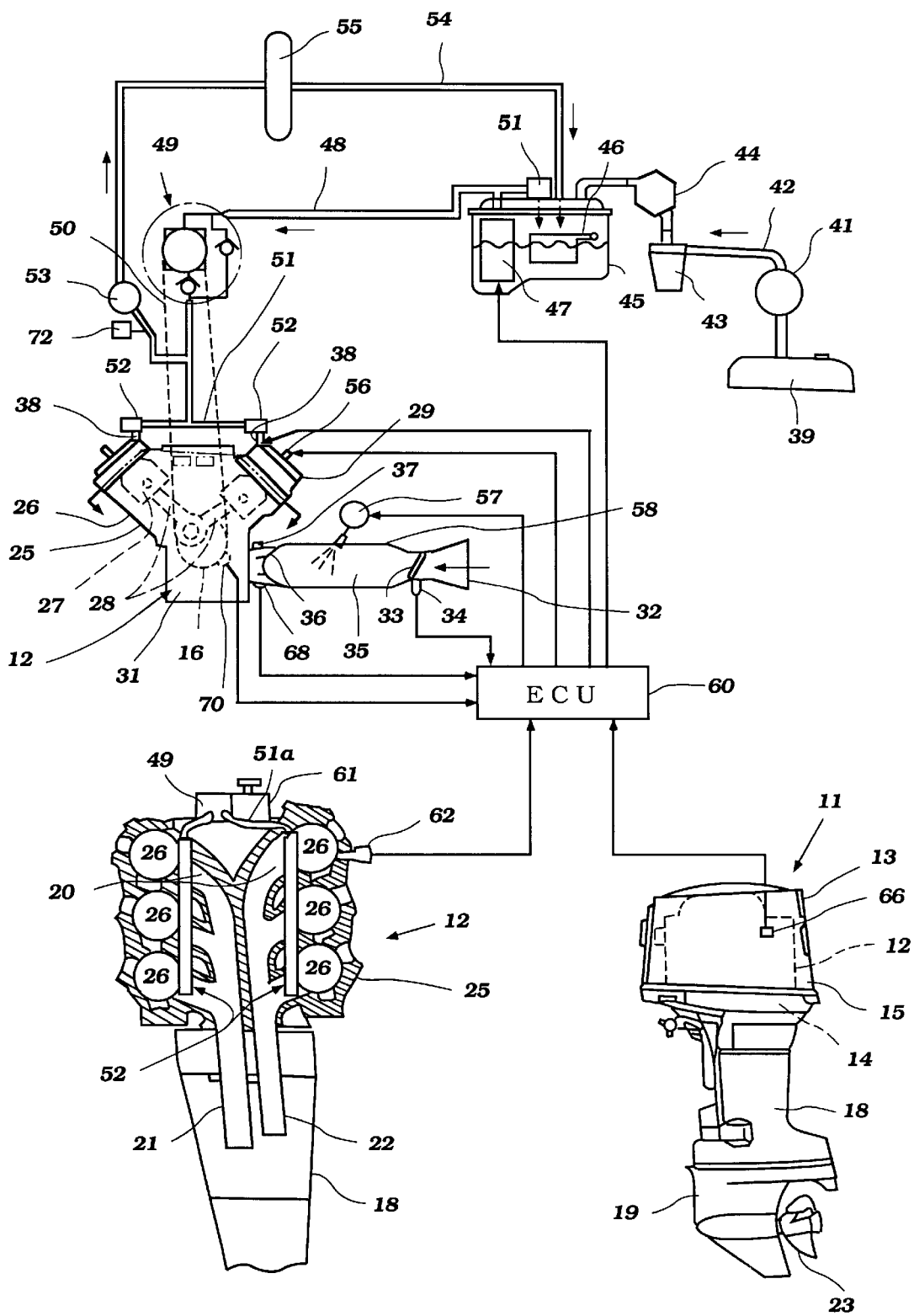
FIG. 1 illustrates an outboard motor and components thereof, including a rear elevational view of the upper portion of the outboard motor with the protective cowling removed and with the engine shown partially in cross-section and a side elevational view of the outboard motor.
Figure 2:
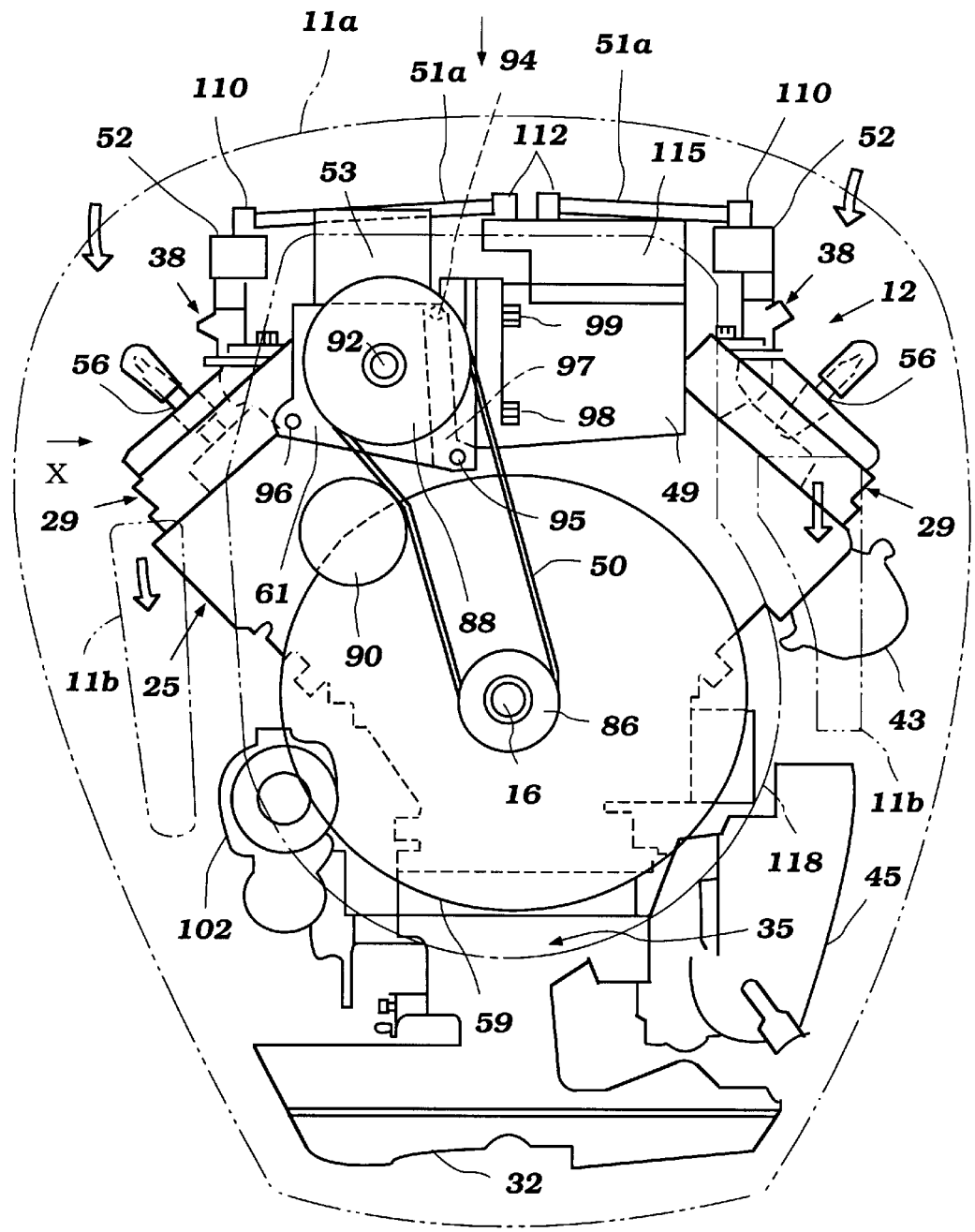
FIG. 2 is a top plan view of the engine of the power head illustrating the protective cowling in outline and with portions of the engine broken away so as to more clearly show the internal construction.
Figure 3:
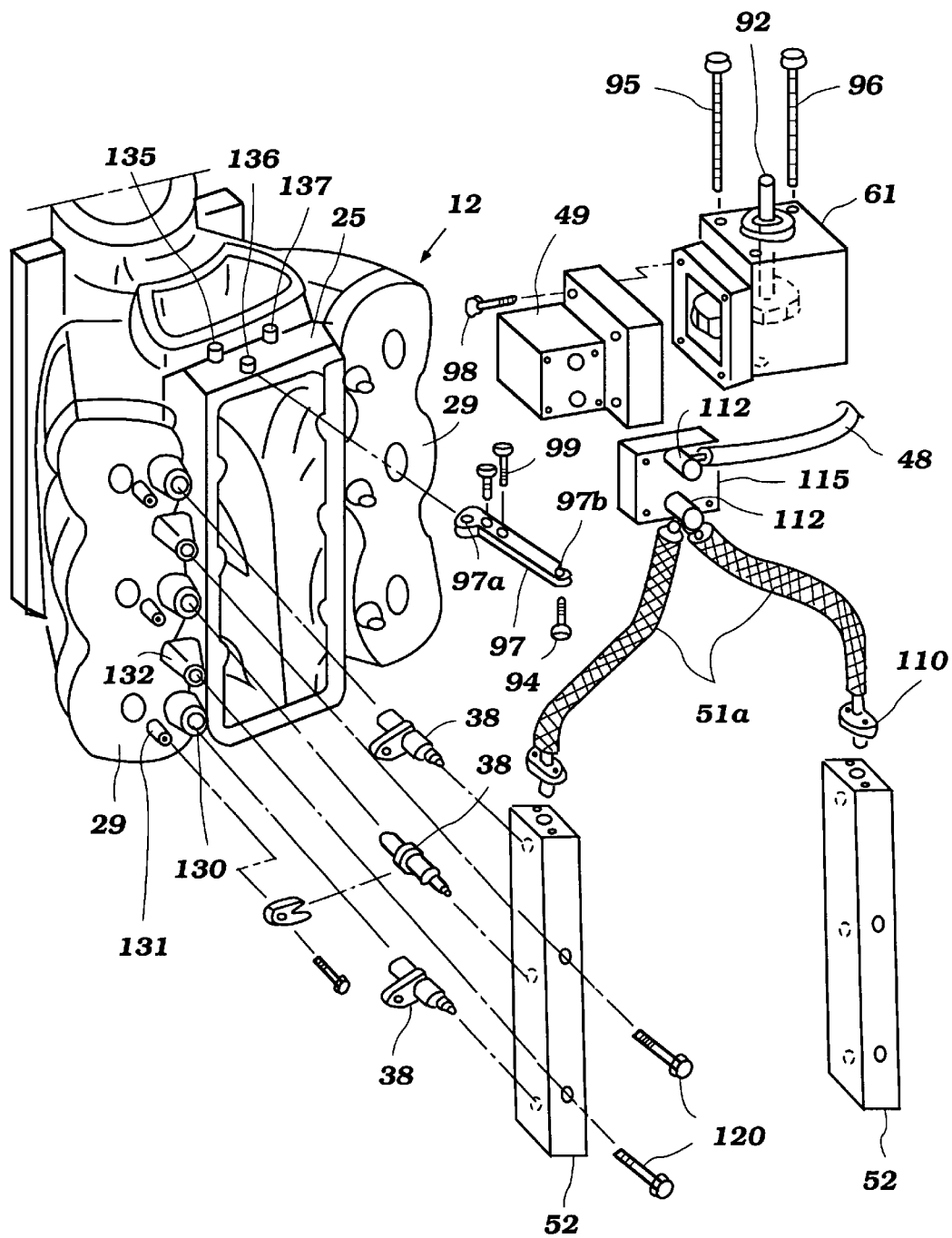
FIG. 3 is an exploded view of the a portion of the engine and fuel system of FIG. 1.

With reference now in detail to the drawings and initially to FIGS. 1–3, an outboard motor constructed in accordance with an embodiment of the invention is identified generally by the reference numeral 11. The general overall construction of the outboard motor 11 may be of any conventional type and, as should be apparent from the foregoing description, the invention deals primarily with an internal combustion engine 12, which forms a portion of the power head, indicated generally by the reference numeral 13, of the outboard motor. More specifically, the invention deals with the manner in which certain accessories for the engine 12 are driven. However, in order to permit those skilled in the art to understand the environment in which the invention is practiced, the overall construction of the outboard motor 11 will be described generally.

The power head 13 includes, in addition to the engine 12, a protective cowling 11a that is comprised of a lower tray portion 14 to which a removable upper, main cowling portion 15 is detachably connected in a manner known in the art. The outboard motor 11 further includes a driveshaft housing 18 positioned beneath the power head 13. A lower unit 19 contains a transmission for driving a propeller 23. This provides a propulsion force for the watercraft with which the outboard motor 11 is associated.

In the illustrated embodiment, the engine 12 is depicted as being of a two-cycle, crankcase compression type having six cylinders arranged in a V orientation. It should be apparent, however, that the invention can be utilized with a wide variety of engine types and engines having other numbers of cylinders and other cylinder configurations. Also, the invention can be utilized with four cycle engines. However, the invention has particular utility with multiple cylinder engines for the reasons aforenoted.

The engine 12 is comprised of a cylinder block 25 which has a pair of cylinder banks that are disposed at a V angle which diverges rearwardly in the power head 13. Cylinder bores 26 are formed in each cylinder bank of the cylinder block 25 and receive respective pistons 27 that reciprocate therein. The pistons 27 are connected by means of connecting rods 28 to the throws of the crankshaft 16 in a manner that is well known in this art. The pistons 27, cylinder bores 26 and cylinder head assemblies 29, that are affixed to each of the cylinder banks in a known manner, form the combustion chambers of the engine.

The crankshaft 16 rotates within a crankcase chamber that is formed by the skirt of the cylinder block 25 and a crankcase chamber 31 that is detachably connected thereto. This crankcase chamber 31 is divided into individual sealed compartments each of which is associated with a respective one of the cylinder bores 26 in a manner well known in the two cycle engine art.

An intake charge is delivered to these crankcase chambers 31 by an induction system which is shown schematically in FIG. 1 and which appears partially in FIGS. 2 and 3. This induction system includes an air inlet device 32 which may be configured to provide silencing for the inducted air. This air is drawn from within the protective cowling 11a in a manner well known in the outboard motor art and flows out of the air slots 11b. The main cowling member 11a and/or tray 14 may be formed with a suitable air inlet so that atmospheric air can enter into the interior of the protective cowling. Preferably, this inlet is designed in such a way so as to minimize the possible ingestion of water particles into the interior of the protective cowling of the power head 13.

The air inlet device 32 supplies the inducted air to throttle bodies 33 which are disposed on the crankcase chamber 31 at the front of the power head 13. Throttle valves 34 mounted in the throttle bodies 33 are controlled by a suitable linkage system for controlling the speed at which the engine 12 operates.

The throttle bodies 33 communicate with the manifold runners 35 of an intake manifold so as to supply the air charge to the crankcase chamber sections. Reed-type check valves 36 are disposed at the ends of the manifold runners 35 where they communicate with intake ports 37 for delivering the air charge to these crankcase chamber sections.

The reed type check valves 36 operate, in a manner well known in the art, so as to permit the air charge to flow into the crankcase chamber sections when the pistons 27 are moving upwardly in the cylinder bores 26. As the pistons begin their downward stroke, however, the reed type check valves 36 will close so as to permit the charge to be compressed in the crankcase chamber sections without escape therefrom.

Upon continued downward movement of the pistons 27, scavenge ports (not shown) will open to communicate the crankcase chamber sections with the combustion chambers in a manner well known in this art. The charge is then transferred to the combustion chambers for further compression therein.

Fuel is mixed with this compressed air charge for providing the motive power for the engine 12. This fuel is sprayed directly into the combustion chambers by fuel injectors 38 that are mounted in the cylinder head assemblies 29 and discharge directly into the combustion chambers. These fuel injectors 38 are supplied with fuel under pressure by a fuel supply system. After the fuel is burned in the cylinder bores 26, any remaining fuel or exhaust is expelled through the exhaust ports 20. The exhaust ports 20 communicate with the left exhaust manifold 21 and the right exhaust manifold 22 to expel the exhaust from the cylinder bores 26.

The fuel supply system includes a remotely positioned fuel tank 39 which generally is located in the hull of the associated watercraft. A priming pump 41 delivers fuel to a conduit 42 which has a quick disconnect connection to the power head 13, and specifically to a fuel filter 43 positioned therein.

The fuel filter 43 filters fuel that is drawn by a low-pressure pump or pumps 44. These pumps 44 may be driven by the pressure variation in the crankcase chamber sections, or in some other manner, from the engine. The pumped fuel is then delivered to a vapor separator assembly 45 that is mounted within the power head 13 and enclosed by the protective cowling portion 11a.

A uniform level of fuel is maintained in the vapor separator 45 by a float-operated valve 46 that controls the admission of fuel to the vapor separator 45. A low-pressure, electrically driven fuel pump 47 is mounted in this vapor separator and collects the fuel and delivers it to a pressure feed line 48. The pressure feed line 48, in turn, communicates with the inlet side of a high-pressure pump 49. The high-pressure pump 49 is preferably of the plunger or piston type, and is driven from the engine crankshaft 16 via a belt 50, as will be described below. The high-pressure pump 49, in turn, delivers fuel under pressure to a main fuel manifold 51, which preferably is located in the valley between the cylinder banks. The main fuel manifold 51, in turn, communicates with fuel rails 52 via fuel lines 51a. The fuel rails 52 are each associated with the fuel injectors 38, which are in turn associated with a respective cylinder of the cylinder banks. The fuel rails 52 are mounted to the cylinder head assemblies 29 using bolts 120 into mounting apertures 130, 132.

The high-pressure pump 49 is provided in communication with the main fuel manifold 51. This regulates the pressure delivered to the injectors 38 by dumping fuel back to the vapor separator through a return line 54. A heat exchanger 55, or fuel cooler, is provided in this return line for controlling the temperature of the fuel and maintaining it at the desired temperature, to further ensure against vapor being present in the fuel system. A fuel pressure sensor 72 is provided in the return line 54 to detect the pressure of the fuel at the high-pressure pump 49.

The fuel is injected directly into the combustion chambers, as discussed above, by the injectors 38. The specific fuel control system and strategy therefore may be of any known type. This fuel mixes with the compressed air and then is ignited by spark plugs 56 that are mounted in the cylinder head assemblies 29. These spark plugs 56 are fired by a suitable ignition system in accordance with any desired timing program.

The engine 12 is provided with a lubricating system that includes a lubricant pump 57 that supplies fuel to lubricant injectors 58 in a controlled manner. These injectors 58 spray into the intake manifold runners 35 or, alternatively, deliver lubricant to the moving components of the engine for direct lubrication. Any type of lubricating system may be employed, and this is controlled, like the fuel injectors 38 and spark plugs 56, by a suitable control in accordance with any desired strategy.

The overall operation of the fuel system is controlled by an electronic control unit (ECU) 60. The ECU 60 receives input signals from an air-fuel ratio sensor 62, a coolant temperature sensor 66, an intake temperature sensor 68, and an engine speed sensor 70. The ECU 60 processes this information and, based upon the results, provides control signals to the fuel pump 47, the fuel injectors 38, the spark plugs 56, and the lubricant pump 57. Therefore, the ECU 60 can adjust the amount of fuel flow and the timing of the engine 12. The use of an ECU 60 to control the fuel system of an engine 12 is well known to one of skill in the art.

FIG. 2 shows that the crankshaft 16 rotates about a vertically extending axis. A flywheel assembly 59 is fixed for rotation with the crankshaft 16 at a point above the upper end of the cylinder block 25 and crankcase chamber 31. This flywheel assembly 59 may also include a flywheel magneto which generates electricity for the ignition system and provides certain timing pulses associated therewith. A starter motor 102 is connected to the flywheel assembly for electronic starting of the engine 12.

The fuel supply and drain unit 115 interconnects with the crankshaft 16. A pump drive pulley 86 is mounted above the flywheel 59 and connected for rotation with the crankshaft 16. The pump drive pulley 86 also drives a toothed drive belt 50. The drive belt 50 in turn drives a high-pressure fuel pump driven pulley 88. A belt tensioner 90 maintains a proper amount of tension on the drive belt 50. The driven pulley 88 is connected to an input shaft 92 of a pump drive unit 61 that contains an appropriate transmission for driving the high-pressure pump 49 of the fuel injection system. The relative sizes of the drive pulley 86 and the driven pulley 88 may be adjusted as engine size and reduction requirements dictate.

The pump drive unit 61 is secured to the engine with bolts 94, 95, and 96. The high-pressure pump 49 is secured to the cylinder head assemblies 29 through a mounting bracket 97 using bolts 98, 99. The mounting bracket 97 includes bolt holes 97a and 97b. The bolts 95, 96, and 99 secure into the cylinder head assemblies 29 in a plurality of mounting apertures 135, 136, and 137. The entire flywheel assembly 59 is protected by a rotor cover 118.

The fuel rails 52 are connected to the high-pressure fuel pump 49 through the fuel lines 51a. The fuel lines 51 a are secured to the engine 12 with connectors 110, 112.

Figure 4:
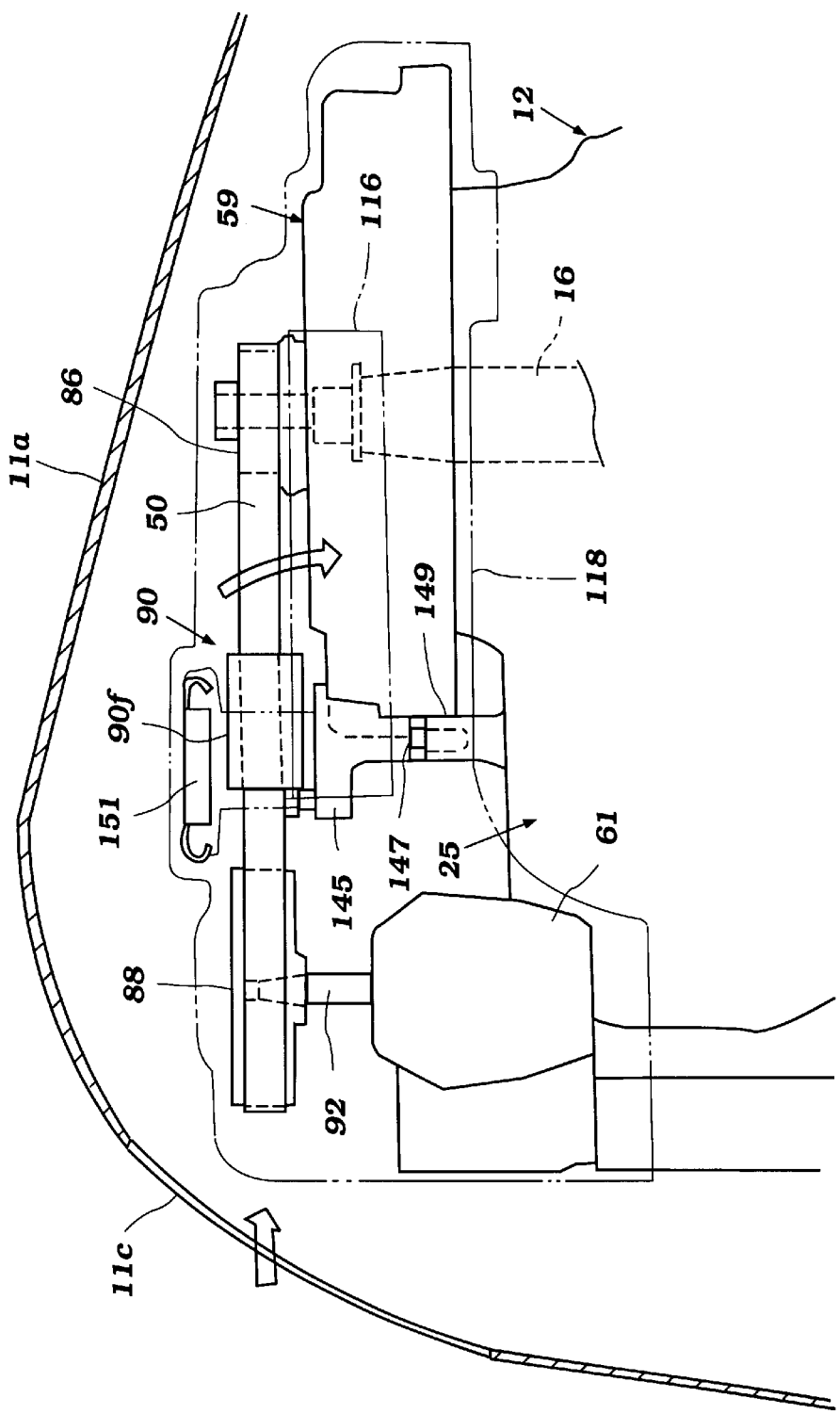
FIG. 4 is a side plan cut-away view of the top portion of the cowling of FIG. 1.

FIG. 4 illustrates a side plan cut-away view of the top portion of the cowling 11a containing the engine 12. Air enters the cowling 11a through an air opening 11c and flows over the fuel system and out the air slots 11b as indicated. The air provides for cooling of the fuel system.

The pump drive pulley 86 is powered from the crank shaft 16. As the pump drive pulley rotates, the belt 50 transfers the rotational energy to drive the driven pulley 88. The driven pulley 88 rotates the input shaft to the pump drive unit 61, providing power to the high-pressure fuel system. The belt tensioner 90 ensures that the belt 50 maintains proper tensioning with the pulleys 86, 88. A spring 151 is used to maintain a tension pulley 90f tight against the belt 50. The belt tensioner 90 is secured to the cylinder block 25 with a bracket 145. The bracket 145 mounts using a bolt 147 in a mounting hole 149.

As best seen in FIG. 2, the position of the drive pulley 86 above the flywheel 59 enables the drive pulley 86 to be easily serviced without removing the flywheel 59. In addition, this location permits a smaller diameter drive pulley 86 than if the pulley 86 were located beneath the flywheel 86 because of the large mass flywheel located on the outer end of the crankshaft 16.

A diameter of the driven pulley 88 is larger than a diameter of the drive pulley 86. The respective diameters sizes desirably are selected to achieve a reduction ratio suited to drive the high pressure fuel pump at a speed tailored to supply an appropriate amount of fuel to the fuel injectors at an effective pressure for injection. That is, in order to supply an appropriate amount of fuel to the fuel injectors at a desired pressure, the diameters of the drive and driven pulleys should be properly set so that a suitable reduction ratio is attained from the crankshaft 16 to the input shaft 92 of the pump drive unit 61. In addition, by varying the diameter size of the drive pulley, the same fuel pump and pump drive unit can be used with various size engines, thereby amortizing the manufacturing and developments costs associated with the high pressure fuel supply system over a greater number of units.

The size of the pulleys 86, 88 also are selected to minimize the space occupied by the pump drive mechanism on the top end of the engine to maintain a compact engine layout. For this purpose, the drive pulley 86 is also sized smaller than the flywheel 59 (or another rotor disposed below the drive pulley 86), and only a little larger than the diameter of the crankshaft 16. In the illustrated embodiment, the diameter of the drive pulley is at least three times smaller than a diameter of the flywheel, and is generally about three times larger than the upper end of the crankshaft 16 to which it is affixed. The relative size variations between the drive pulley and driven pulley and their respective shafts produces the desired reduction ratio as well as contributes to a compact engine arrangement. Thus, in the illustrated embodiment, a ratio of the diameter size of the drive pulley relative to a diameter size of the upper end of the crankshaft is smaller than a ratio of diameter sizes of the diameter of the driven pulley relative to a diameter size of a rotational shaft 92 of the pump drive unit 61. Thus, the diameter of the drive pulley is reduced while maintaining the desired reduction ratio to decrease the size of the engine.

As best understood from FIG. 2, the pump 49 and the pump drive unit 61 are disposed within a valley between the two banks of cylinders. In this position, the driven pulley 88 is located in the vicinity of the crankshaft 16, the drive pulley 88, as well as the pump drive unit 66, are less likely to be affected by vibrations thereby improving the durability of these components. This arrangement also locates the high pressure fuel pump 49 near the crankshaft 16 to minimize vibrations experienced by this heavy component.

Figure 5A:
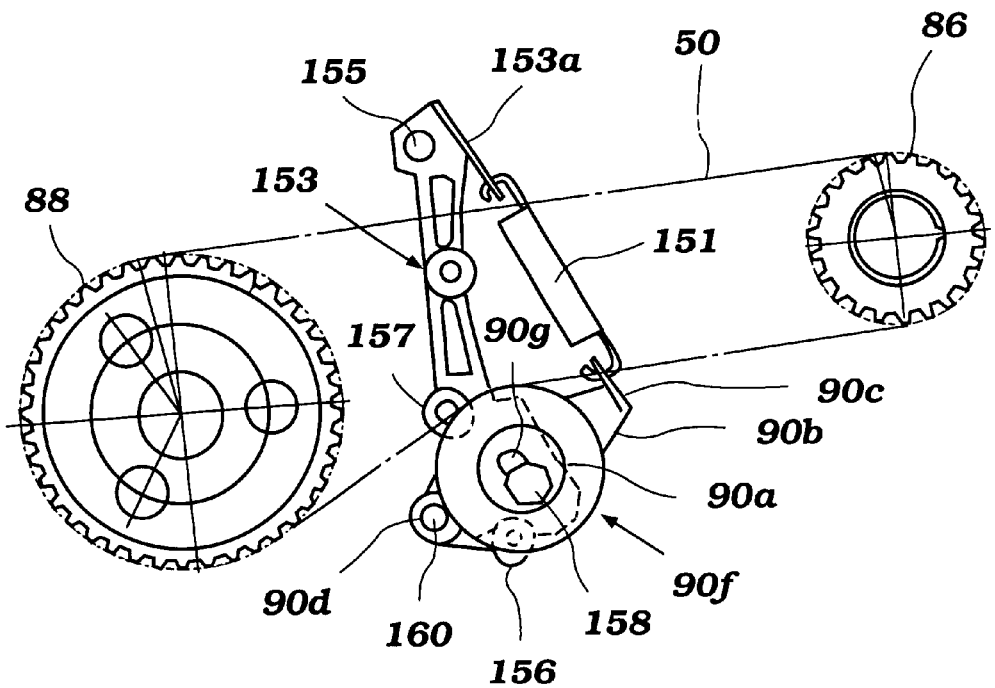
FIG. 5a is a top plan view of the pulley system and belt tensioner according to the present invention.
Figure 5B:
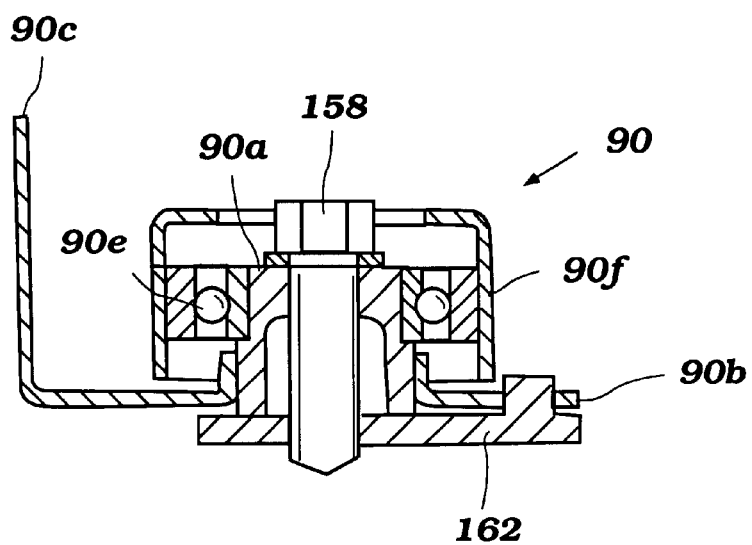

FIGS. 5a and 5b provide a detailed view of the belt tensioner 90. A bracket 153 extends away from the belt tensioner 90, and a spring receiver 153a is at the end of the bracket 153. The bracket is secured with bolts 155, 157. A second bracket 90b extends approximately perpendicular to the first bracket 153 and is mounted to a support bracket 162. The second bracket rotates around a shaft 160 and includes a bolt 156 to limit the bracket 90b movement away from the belt 50. The second bracket 90b also has a spring receiver 90c at the far end. The spring 151 is attached between the two brackets 153, 90b using the spring receivers 153a, 90c. The spring 151 urges the tension pulley 90f into the belt 50 to maintain the proper tension. The tension pulley 90f is moveably mounted using a bolt 158 in an elongated aperture 90g. As the bracket 90b moves because of the force of the spring 151, the bolt 158 moves within the elongated aperture 90g to either increase or decrease the tension on the belt 50. Ball bearings 90e are used to ease the movement of the bolt 158.

Figure 6A:
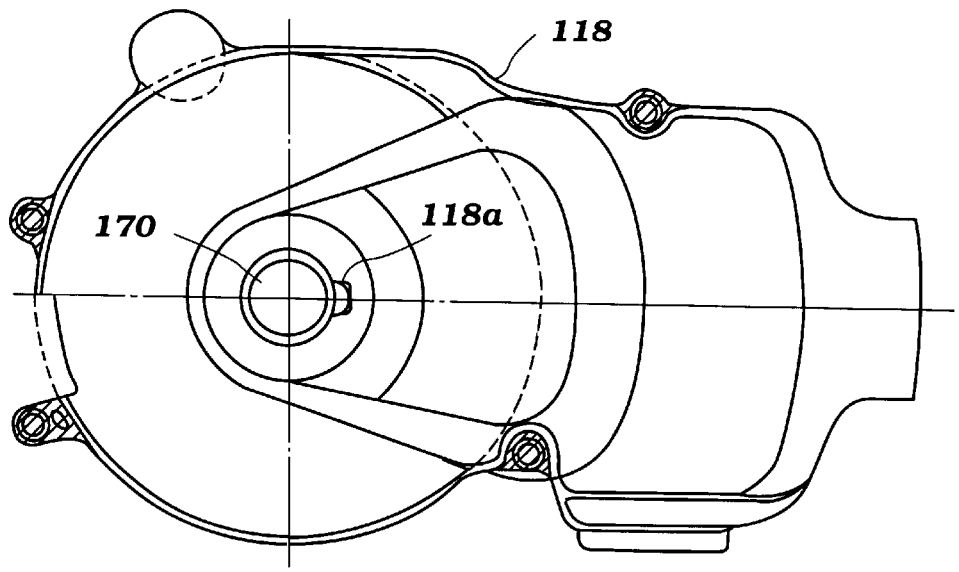
FIG. 6a is a top plan view of the engine of FIG. 1 showing the rotor cover.
Figure 6B:
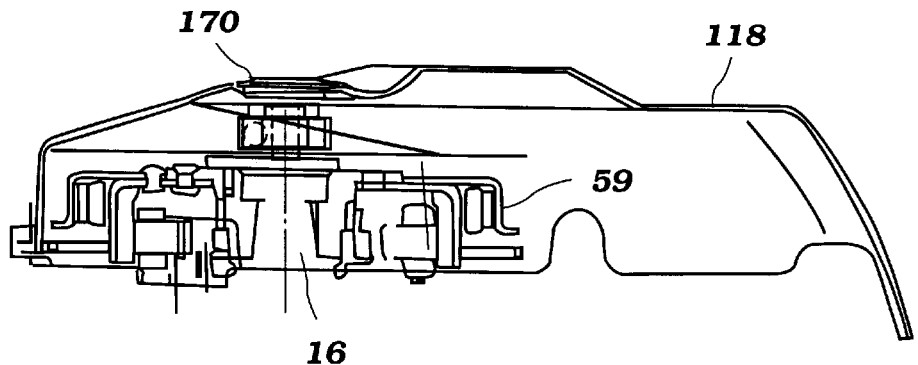
FIG. 6b is a side plan cut-away view of the top portion of the engine of FIG. 6a according to one embodiment of the present invention.
Figure 6C:
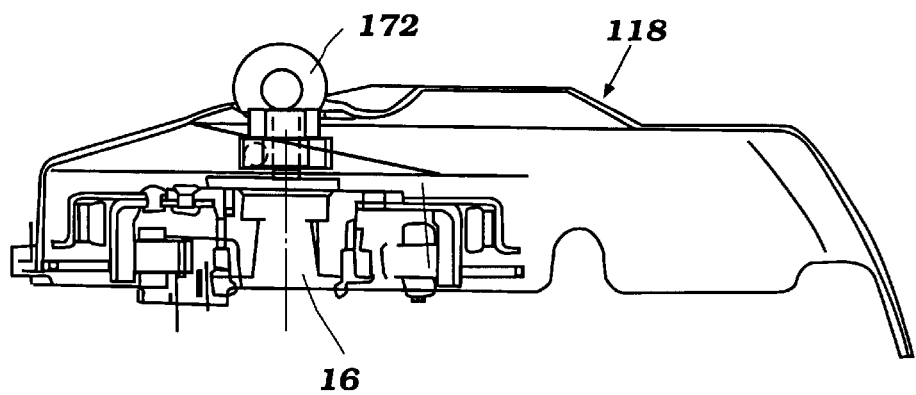
FIG. 6c is a side plan cut-away view of the top portion of the engine of FIG. 6a according to an additional embodiment of the present invention.

FIGS. 6a and 6b show the rotor cover 118 having an opening 118a. The opening 118a has a large diameter and allows for access to the flywheel assembly 59 for maintenance. When the engine is in use, the opening 118a is covered with a cap 170 to protect the engine 12 against the environment. As seen in FIG. 6c, the cap 170 may be replace with a hanger 172 if desired. As understood from FIG. 2, the cover extends over the drive and driven pulleys 86, 88.

Numerous variations and modifications of the invention will become readily apparent to those skilled in the art. For instance, the rotor above which the drive pulley 86 is disposed can be a cam drive pulley which forms a portion of a camshaft drive system used in conjunction with the four cycle engine. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An outboard motor comprising a power head containing an internal combustion engine including a crankshaft that is generally vertically disposed, a rotor affixed to the crankshaft, a drive pulley affixed to the crankshaft above the rotor, the drive pulley having a first diameter, a driven pulley having a second diameter which is larger than the first diameter, a drive belt which connects the drive pulley to the driven pulley, and a high pressure fuel pump coupled to the driven pulley.

2. The outboard motor of claim 1, wherein the rotor is a flywheel.

3. The outboard motor of claim 2, wherein the first diameter of the drive pulley is at least three times smaller than a diameter of the flywheel.

4. The outboard motor of claim 1, wherein the first diameter of the drive pulley is smaller than a diameter of the rotor.

5. The outboard motor as in claim 1, wherein the first diameter of the drive pulley is generally about three times a diameter of a section of the crankshaft to which the drive pulley is affixed.

6. The outboard motor as in claim 1, wherein a ratio of the first diameter size of the drive pulley relative to a diameter size of a section of the crankshaft to which the drive pulley is affixed is smaller than a ratio of diameter sizes of the second diameter size of the driven pulley relative to a diameter size of an input shaft coupled to the high pressure fuel pump.

7. The outboard motor of claim 1, wherein the engine is covered by a cowling having air slots.

8. The outboard motor of claim 1, wherein the drive pulley, the driven pulley, and the drive belt include interlocking teeth which mesh to positively drive the driven pulley.

9. The outboard motor of claim 1 additionally comprising a belt tensioner which provides tension to the drive belt.

10. The outboard motor of claim 1, wherein the engine comprises a plurality of cylinders.

11. The outboard motor of claim 10, wherein the cylinders are disposed in two cylinder banks that are arranged in a V configuration.

12. The outboard motor of claim 11, wherein the high pressure fuel pump is located within a valley formed between the cylinder banks.

13. The outboard motor of claim 1, wherein the engine additionally includes a cover that extends over at least the drive and driven pulleys.

14. The outboard motor of claim 13, wherein the cover completely extends over the rotor.

15. The outboard motor of claim 1, wherein the high pressure fuel pump delivers fuel to a plurality of fuel injectors each of which injects fuel directly into a combustion chamber of the engine.

16. The outboard motor of claim 15, wherein the size of the drive pulley and driven pulley are selected to achieve a reduction ratio suited to drive the high pressure fuel pump at a speed tailored to supply an appropriate amount of fuel to the fuel injectors at an effective pressure for injection.

17. An outboard motor comprising a power head containing an internal combustion engine including a plurality of combustion chambers and a crankshaft that is generally vertically disposed, a rotor affixed to the crankshaft, a high pressure fuel pump driven by the crankshaft, the high pressure fuel pump delivering fuel to a plurality of fuel injectors each of which injects fuel directly into one of the combustion chambers, and means for driving the high pressure fuel pump at a speed tailored to supply an appropriate amount of fuel to the fuel injectors at an effective pressure for injection, the means for driving the high pressure fuel pump being located above the rotor.

18. The outboard motor of claim 17, wherein the rotor is a flywheel.

19. The outboard motor of claim 17, wherein the engine includes a plurality of cylinders in which the combustion chambers are formed, and the cylinders are disposed in two cylinder banks that are arranged in a V configuration.

20. The outboard motor of claim 19, wherein the high pressure fuel pump is located within a valley formed between the cylinder banks.

21. The outboard motor of claim 17, wherein the engine additionally includes a cover that extends over at least said means for driving the high pressure fuel pump.

22. An outboard motor comprising an internal combustion engine, a generally vertically disposed crankshaft, a rotor affixed to the crankshaft and adapted to rotate therewith, a drive pulley affixed to the crankshaft and adapted to rotate therewith, a fuel system comprising a high pressure fuel pump, the high pressure fuel pump being coupled with a driven pulley, and a drive belt operatively connecting the drive pulley with the driven pulley, the driven pulley having a greater diameter than the drive pulley.

23. The outboard motor of claim 22, wherein the drive pulley has a diameter at least three times greater than a diameter of a section of the crankshaft to which the drive pulley is affixed.

24. The outboard motor of claim 23, wherein the rotor is positioned generally above the internal combustion engine.

25. An outboard motor comprising an internal combustion engine including a plurality of combustion chambers, a generally vertically disposed crankshaft, a rotor affixed to an upper portion of the crankshaft and adapted to rotate therewith, a drive pulley affixed to the crankshaft above the rotor, a fuel system comprising a high pressure fuel pump, the high pressure fuel pump being drivingly coupled with a driven pulley, and a drive belt operatively connecting the drive pulley with the driven pulley so that the crankshaft drives the high pressure fuel pump.

26. The outboard motor of claim 25, wherein the engine comprises a plurality of cylinders disposed in two cylinder banks that are arranged in a V configuration, and the high pressure fuel pump is located within a valley formed between the cylinder banks.

27. The outboard motor of claim 25, wherein the fuel system comprises a plurality of fuel injectors adapted to deliver fuel to the combustion chambers.

* * * * *

UNITED STATES PATENT AND TRADEMARK OFFICE
CERTIFICATE OF CORRECTION

PATENT NO. : 6,302,753 B1
DATED : October 16, 2001
INVENTOR(S) : Masahiko Kato and Yoshihiko Okabe It is certified that error appears in the above-identified patent and that said Letters Patent is hereby corrected as shown below:

<u>Title page,</u>
Item [73], Assignee, change "Sanshen Kogyo Kabushiki Kaisha (JP)"
to -- Sanshin Kogyo Kabushiki Kaisha (JP) --.

Signed and Sealed this

Seventh Day of May 2002

Attest:

Attesting Officer

JAMES E. ROGAN
*Director of the United States Patent and Trademark Office*